US008887095B2

(12) United States Patent
Krishnamurthy et al.

(10) Patent No.: US 8,887,095 B2
(45) Date of Patent: Nov. 11, 2014

(54) RECOMMENDING DIGITAL CONTENT BASED ON IMPLICIT USER IDENTIFICATION

(75) Inventors: Satish Kumar Krishnamurthy, Los Gatos, CA (US); John Funge, Sunnyvale, CA (US); Neil D. Hunt, Los Altos, CA (US); Todd Scot Yellin, Los Gatos, CA (US); Jonathan Michael Sanders, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 481 days.

(21) Appl. No.: 13/080,420

(22) Filed: Apr. 5, 2011

(65) Prior Publication Data
US 2012/0260214 A1  Oct. 11, 2012

(51) Int. Cl.
*G06F 3/14* (2006.01)
*G06Q 30/02* (2012.01)

(52) U.S. Cl.
CPC ............................... *G06Q 30/0251* (2013.01)
USPC ..... 715/811; 715/700; 705/14.52; 705/14.55; 705/14.73; 706/16; 706/20; 707/769; 463/42

(58) Field of Classification Search
USPC ............ 715/200–277, 700–867; 345/30–111; 709/201–229; 700/701–866; 705/14.52, 50–79, 14.55, 14.73; 706/16, 20; 707/769; 463/42
See application file for complete search history.

(56) References Cited

U.S. PATENT DOCUMENTS

| | | | |
|---|---|---|---|
| 7,788,188 B2 | 8/2010 | Kramer | |
| 8,386,509 B1 * | 2/2013 | Scofield et al. | 707/769 |
| 8,556,722 B2 * | 10/2013 | Novi et al. | 463/42 |
| 2008/0209229 A1 | 8/2008 | Ramakrishnan et al. | |
| 2008/0242279 A1 | 10/2008 | Ramer et al. | |
| 2009/0271342 A1 * | 10/2009 | Eder | 706/20 |
| 2012/0215640 A1 * | 8/2012 | Ramer et al. | 705/14.55 |
| 2012/0221411 A1 * | 8/2012 | Graham, Jr. | 705/14.52 |
| 2012/0265621 A1 * | 10/2012 | Sechrist et al. | 705/14.73 |
| 2012/0330869 A1 * | 12/2012 | Durham | 706/16 |

OTHER PUBLICATIONS

International Search Report PCT/US12/32023 dated Jun. 14, 2012.
Chang et al, "Inferring Identity using Accelerometers in Television Remote Controls." In: Proceedings of the 7th International Conference on Pervasive Computing, 2009 pp. 151-167 (online). May 24, 2012. Retrieved from the Internet at URL:<http:www2.seattle.intel-research.net/pub/chang2009inferring.pdf>.

* cited by examiner

*Primary Examiner* — Ruay Ho
(74) *Attorney, Agent, or Firm* — Patterson & Sheridan, LLP

(57) ABSTRACT

One embodiment of the present invention sets forth a technique for recommending digital content to a user of a digital content application based on continually learned patterns of behavior. Based on metrics collected from a current session of the digital content application, properties associated with one or more users interacting with the application are inferred. The inferred properties are matched against previously defined patterns of behavior to identify digital content that could be presented to the one or more users for optional selection.

23 Claims, 5 Drawing Sheets

RECOMMENDING DIGITAL CONTENT BASED ON IMPLICIT USER IDENTIFICATION

BACKGROUND OF THE INVENTION

1. Field of the Invention

Embodiments of the present invention relate generally to digital media and, more specifically, to recommending digital content based on implicit user identification.

2. Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof.

The content player is configured to download and play a digital content file, in response to a user request selecting the title for playback. The user is typically presented with a set of recommended titles for selection. Such recommendations are based primarily on previous operations and/or selections performed by the user. However, in a scenario where multiple users interact with the same content player, the recommendations can be inaccurate. For example, if user A performs certain actions within the content player, the next time any user other than user A, such as user B or C, interacts with the same content player, the recommendations may be based on the actions performed by user A. Further, user A may have one set of interests when interacting with the content player alone and a different set of interests when interacting with the content player in a group. In such a scenario, recommendations based primarily on previous operations and/or selections performed by user A can be inapplicable if the determination is not made regarding who is interacting with the content player. Lastly, in a scenario where the same user may be in different moods/interests at different times, the recommendations can be in applicable if the current mood/interest of the user is not determined.

One solution to the above-mentioned inaccuracy is having the users of the content player explicitly identify themselves (or their mood/interest) every time they begin interacting with the content player. However, this explicit identification puts an additional burden on the user when interacting with the content player and, therefore, is not a desirable user experience.

As the foregoing illustrates, what is needed in the art is an approach for recommending digital content to a user based on his/her identity without requiring explicit identification from the user, or any additional inputs about their interests.

SUMMARY OF THE INVENTION

One embodiment of the present invention sets forth a method for a method for recommending digital content to at least one user. The method includes the steps of analyzing context information related to a current session of a content application to infer a set of properties associated with the at least one user and their current interest, analyzing a plurality of previously defined patterns of behavior to identify a first pattern of behavior most closely associated with the inferred set of properties, and, based on the first pattern of behavior, identifying digital content that should be presented to the at least one user as an option for selection.

One advantage of the disclosed technique is that digital content is recommended to users based on properties related to the identity of the users without having the users explicitly specify their identity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
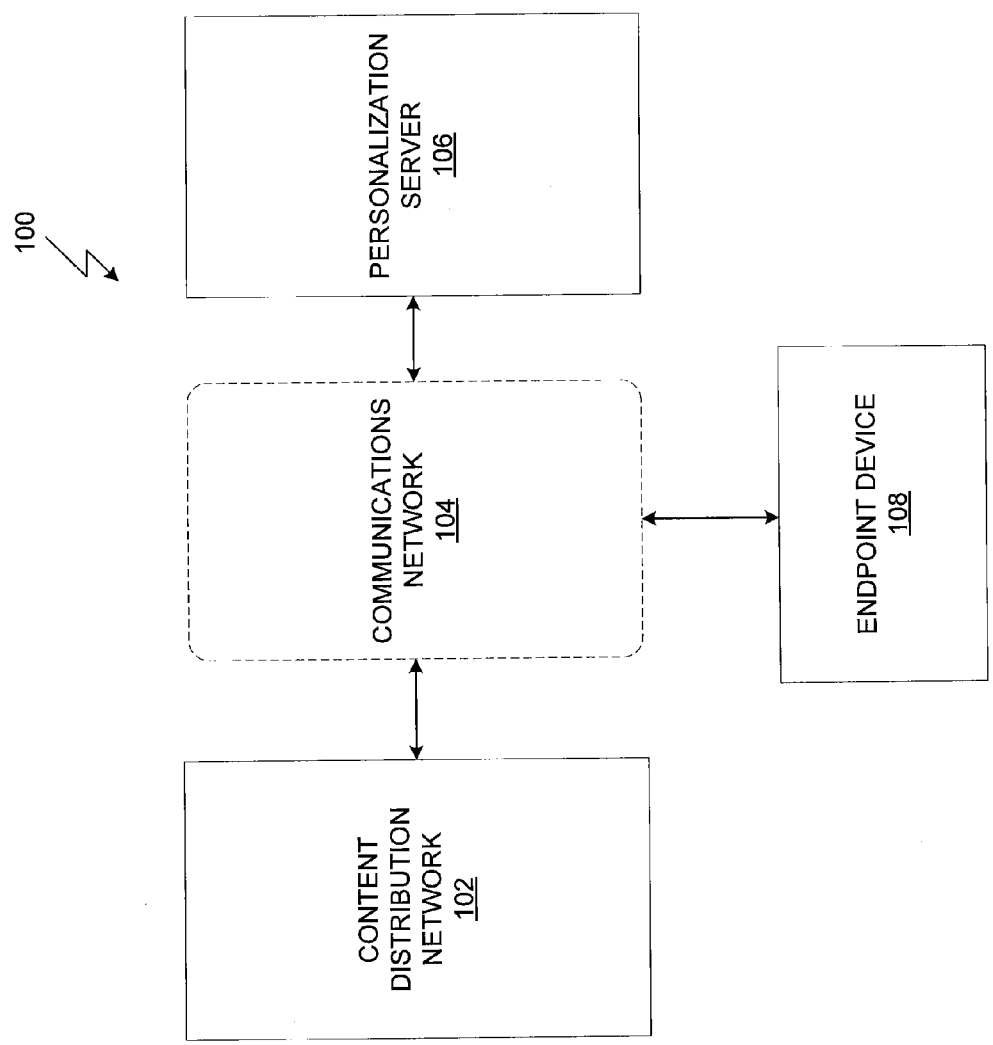
FIG. 1 illustrates a content distribution system configured to implement one or more aspects of the present invention.

FIG. 1 illustrates a content distribution system 100 configured to implement one or more aspects of the invention. As shown, the content distribution system 100 includes a content distribution network (CDN) 102, a communications network 104, a personalization server 106 and an endpoint device 108.

The communications network 104 includes a plurality of network communications systems, such as routers and switches, configured to facilitate data communication between the personalization server 106, the CDN 102 and the endpoint device 108. Persons skilled in the art will recognize that many technically feasible techniques exist for building the communications network 104, including technologies practiced in deploying the well-known internet communications network.

The endpoint device 108 may comprise a computer system, a set top box, a mobile device such as a mobile phone, or any other technically feasible computing platform that has network connectivity and is coupled to or includes a display device and speaker device for presenting video frames, and generating acoustic output, respectively.

The CDN 102 comprises one or more computer systems configured to serve download requests for digital content files received from the endpoint device 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the CDN 102 to the endpoint device 108.

The personalization server 106 interacts with the endpoint device 108 to identify digital content that can be recommended to at least one user of the endpoint device 108. Based on metrics collected at the endpoint device 108 and from any other endpoint devices within the content distribution system 100, the personalization server 106 infers properties related to the identity of the users of the endpoint device 108. The type of digital content that is recommended is then based on the inferred identity. The operations of the personalization server 106 are described in greater detail in conjunction with FIG. 3.

Although, in the above description, the content distribution system 100 is shown with one endpoint device 108 and one CDN 102, persons skilled in the art will recognize that the architecture of FIG. 1 contemplates only an exemplary embodiment of the invention. Other embodiments may include any number of endpoint devices 108 and/or CDNs 102. Thus, FIG. 1 is in no way intended to limit the scope of the present invention in any way.

Figure 2:
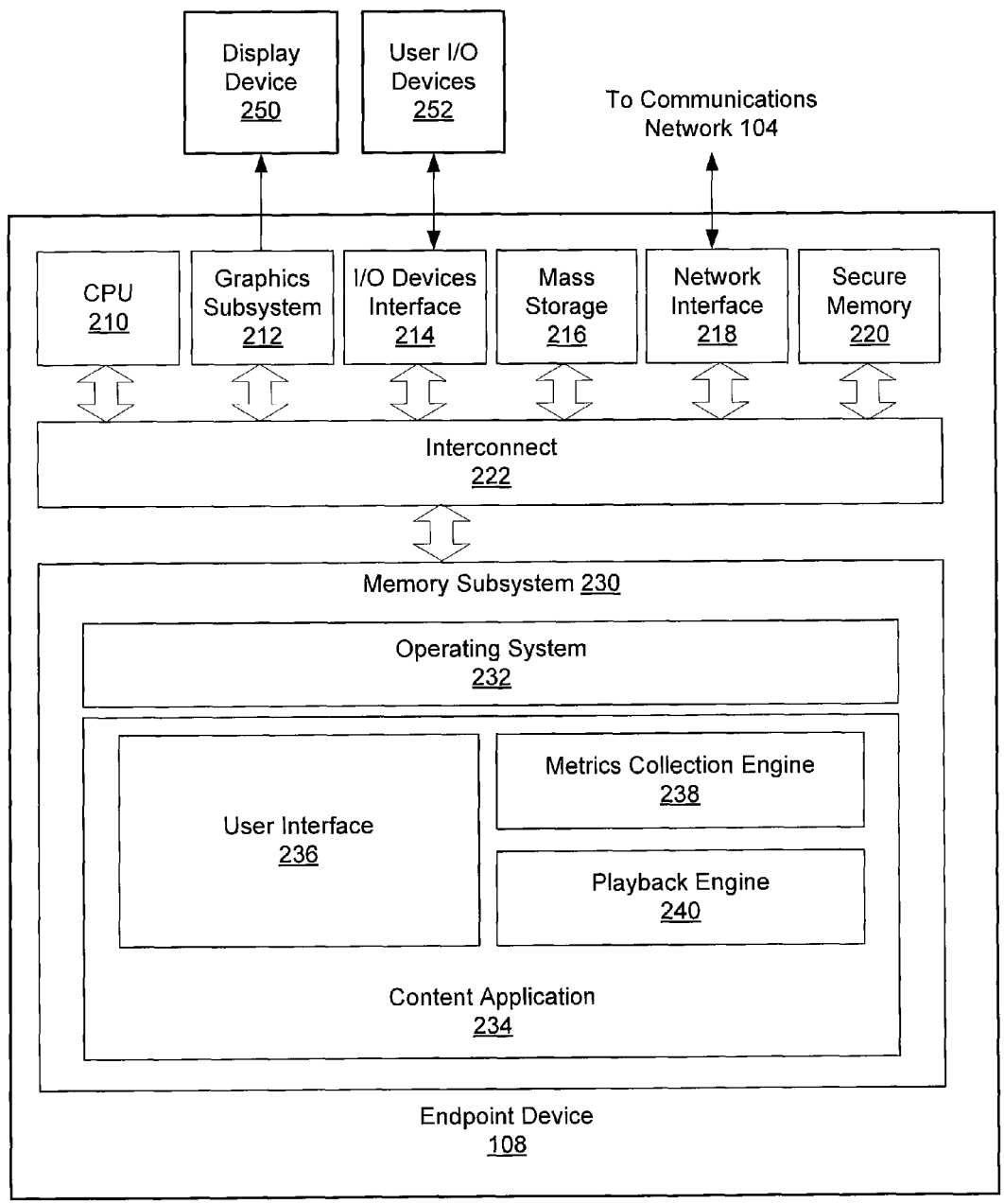
FIG. 2 is a more detailed view of the endpoint device of FIG. 1, according to one embodiment of the invention.

FIG. 2 is a more detailed view of the endpoint device 108 of FIG. 1, according to one embodiment of the invention. As shown, the endpoint device 108 includes, without limitation, a central processing unit (CPU) 210, a graphics subsystem 212, an input/output (I/O) device interface 214, a network interface 218, a secure memory space 220, an interconnect 222 and a memory subsystem 230. The endpoint device 108 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 222 is configured to facilitate transmission of data, such as programming instructions and application data, between the CPU 210, graphics subsystem 212, I/O devices interface 214, mass storage 216, network interface 218, secure memory space 220 and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 222. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 120. In one embodiment, the network interface 218 is configured to communicate using the well-known Ethernet standard. The network interface 218 is coupled to the CPU 210 via the interconnect 222.

The memory subsystem 230 includes programming instructions and data that comprise an operating system 232 and a content application 234. The operating system 232 performs system management functions such as managing hardware devices including the network interface 218, mass storage unit 216, I/O device interface 214, and graphics subsystem 212. The operating system 232 also provides process and memory management models for the content application 234.

The content application 234 includes a user interface 236, a metrics collection engine 238 and a playback engine 240. The content application 234 allows users to browse through and watch digital content that is served by the CDN 102. The content application 234 interacts with the personalization server 106 to recommend digital content to the user of the endpoint device 108 for optional selection. The user interface 234 provides a specific structure, such as a window and object metaphor, for user interaction with the content application 234. Persons skilled in the art will recognize the various operating systems and user interfaces that are well-known in the art and suitable for incorporation into the endpoint device 108.

Within a particular session of the content application 234, the metrics collection engine 238 collects metrics related to the interactions of the user with the content application 234 or metrics related to the execution environment of the content application 234. In one embodiment, a session is a fixed length of time, in another embodiment, a session is a period of uninterrupted user interaction with the content application 234, and, in yet another embodiment, a session may be a new instantiation of the content application 234. The metrics collected by the metrics collection engine 238 may include, but are not limited to, the following:

Content selections: Particular content selected by the user while interacting with the content application 236.

Content browsing patterns

Device information related to the endpoint device 108, such as the device type.

Location information: Location can be determined using the internet protocol (IP) address of the endpoint device 108 or various location-determining devices, such as a global positioning system (GPS) unit attached to or included in the endpoint device 108.

Time of day when the current session was initiated.

Particular button pressed on the user I/O devices for performing certain actions within the content application 236, such as selection, browsing, etc.

Button press timings and pressure.

Button press patterns

Sensor information, such as accelerometers, gyroscopes, magnetometers, and other inertial sensors.

Audio information collected via microphones coupled to the endpoint device 108.

Video information collected via cameras coupled to the endpoint device 108.

The metrics collected by the metrics collection engine 238 are referred to herein as the "context information" associated with the current session. For each session, the metrics collection engine 238 transmits the context information to the personalization server 106 for further processing. As described in greater detail below in conjunction with FIG. 3, the personalization server 106 processes the context information to generate recommendations of digital content for presentation to the user of the endpoint device 108. The user of the endpoint device 108, in response, may select the recommended digital content or browse through the content library of the content application 234 to select digital content for viewing. The selected digital content is downloaded from the CDN 102 and rendered by the playback engine 240.

The metrics described above may be collected across various endpoint devices 108. For example, the sensor information collected from a mobile endpoint device 108, such as a personal digital assistant (PDA), can be used to provide context information for content being displayed on a different endpoint device 108.

Figure 3:
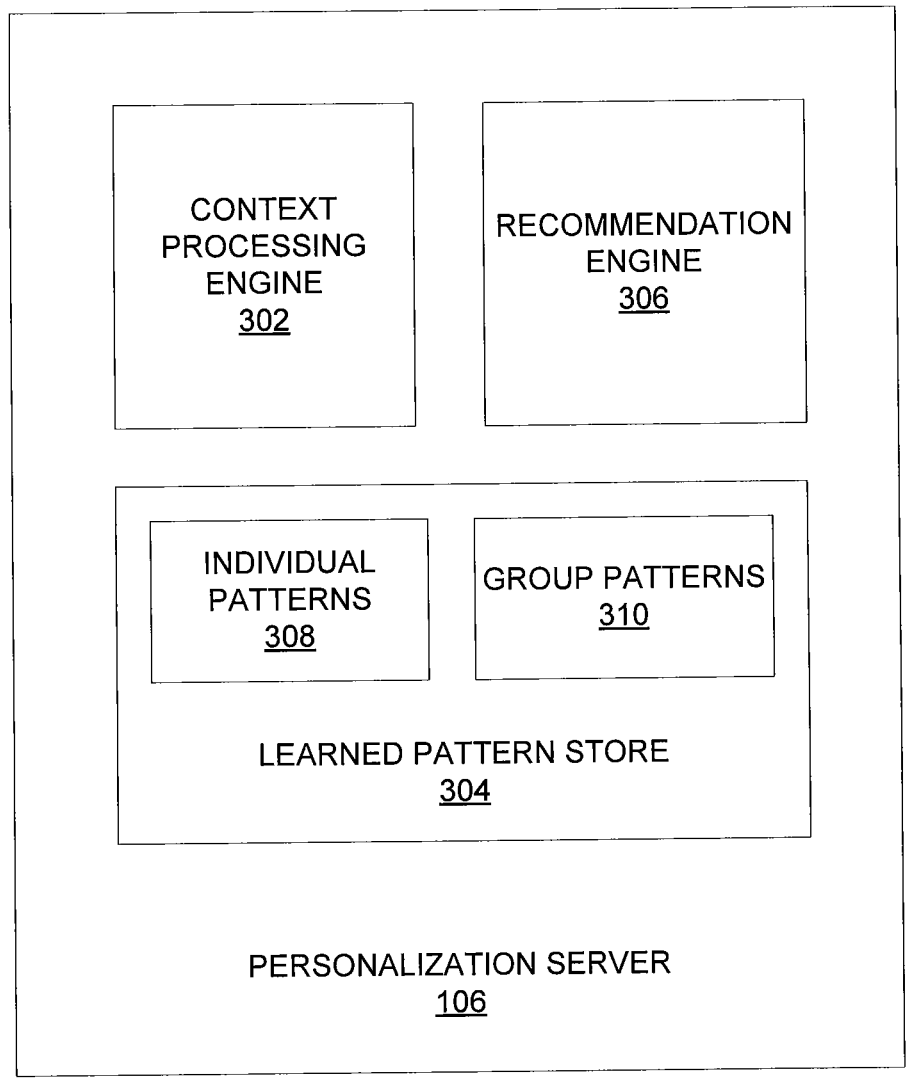
FIG. 3 is a more detailed view of the personalization server of FIG. 1, according to one embodiment of the invention.

FIG. 3 is a more detailed view of the personalization server 106 of FIG. 1, according to one embodiment of the invention. The personalization server 106 includes a context processing engine 302, a learned pattern store 304 and a recommendation engine 306.

As previously described herein, the personalization server 106 interacts with the endpoint device 108 to identify digital content that can be recommended to the user(s) of the endpoint device 108. In operation, upon receiving the context information collected by the metrics collection engine 238, the context processing engine 302 analyzes the context information to infer a set of properties associated with the user(s) of the endpoint device 108. The set of properties may include:
- the actual identity of the user(s). For example, the device information or the audio/video information specified by the context information may be used to recognize a specific named person is probably currently using the device.
- the class of the user(s). The class may specify the age range of the user(s), the emotional state of the user(s), the gender of the user(s), etc. For example, time of day specified by the context information may indicate that a child is using the endpoint device 108. As another example, the button press information, such as the pressure with which the buttons are pressed, can be used to determine the gender or age of the user(s).

Once the set of properties associated with the user(s) of the endpoint device 108 are determined, the context processing engine 302 matches the set of properties against previously-defined patterns of behavior stored in the learned pattern store 304. The pattern of behavior that best-fits the set of properties and, thus, the inferred characteristics of the user(s) of the endpoint device 108, is selected. The patterns of behavior stored in the learned pattern store 304 are identified based on analyzing context information associated with previous sessions of the content application 234 executing on the endpoint device 108 or context information associated with other sessions of the content application 234 executing on other endpoint devices within the content distribution system 100. A pattern of behavior specifies different actions or digital content type selections are probable given a set of properties. Patterns of behavior defined for a particular account or an endpoint device 108 are stored in the individual patterns 308, and patterns of behavior defined across multiple accounts of endpoint devices are stored in the group patterns 310.

In one embodiment, to select a pattern of behavior that best-fits the set of properties determined for the context information, each of the patterns of behavior stored in the learned pattern store 304 is analyzed. When performing such an analysis, a weight is attached to each pattern of behavior based on the set of properties, where the weight indicates a degree of correlation between the set of properties and the pattern of behavior. The pattern of behavior with the highest correlation is then selected. Persons skilled in the art should recognize that any technically feasible machine learning or data-mining techniques, including for example, decision trees, hidden Markov models, Bayesian learning techniques, and other alternatives can be implemented to select a pattern of behavior that best-fits the set of properties. Several machine learning techniques are known in the arts of artificial intelligence and machine learning. The various alternatives include techniques related to evolution strategies, genetic algorithms, genetic programming, multidimensional clustering, neural networks, and weighted majority techniques. In addition, the algorithm may include a weighted average of a set of relatively simpler elements, updated in real time using an exponential gradient technique, or some other machine learning technique.

Once selected, the pattern of behavior that best-fits the set of properties determined for the context information is analyzed by the recommendation engine 306 to identify digital content that should be recommended to the user(s) of the endpoint device 108. The recommendation is based on the different actions or digital content type selections that are specified by the selected pattern of behavior. Information regarding the digital content that should be recommended is then transmitted to the content application 236 for display.

In various embodiments, the functionality implemented by the personalization server 106 may be implemented by the endpoint device 108 or by a combination of the endpoint device 108 and the personalization server 106.

Figure 4:
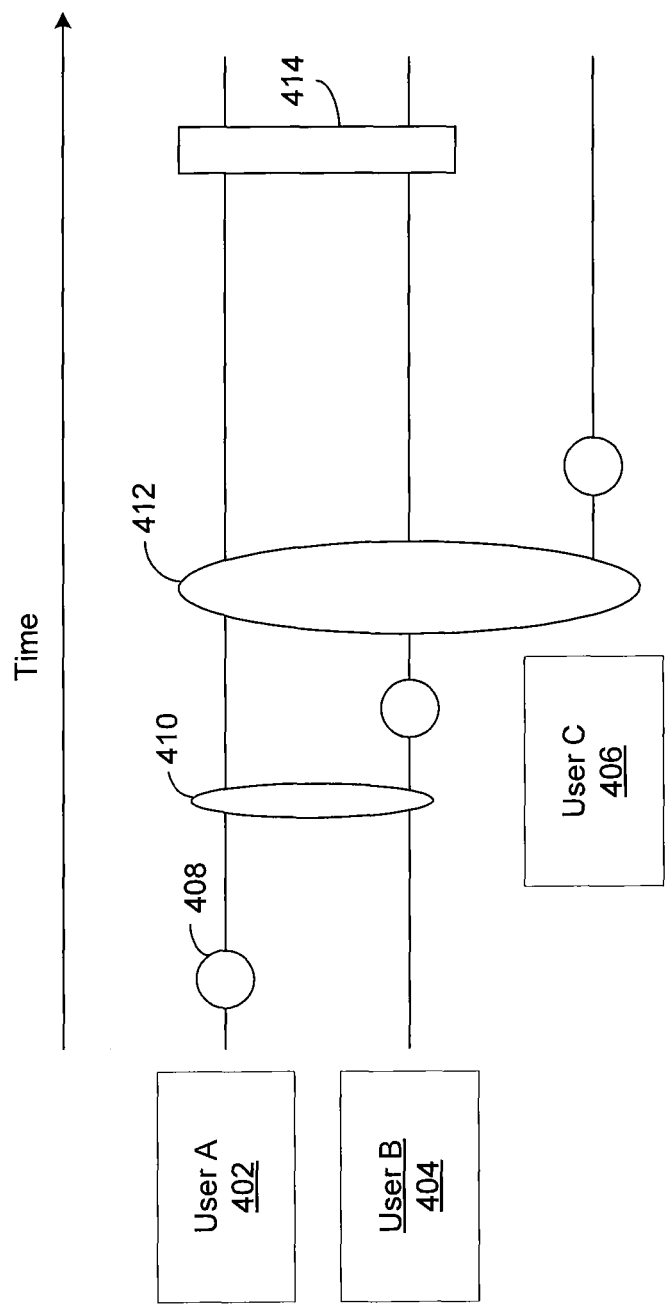
FIG. 4 is a conceptual diagram of a timeline illustrating interactions of multiple users with the content application, according to one embodiment of the invention.

FIG. 4 is a conceptual diagram of a timeline illustrating interactions of multiple users with the content application, according to one embodiment of the invention. User A 402, user B 404 and user C 406 are users of the endpoint device 108. At time 408, user A 402 is using the endpoint device 108 alone, and metrics collected at time 408 are based only on the interactions of user A 402 with the content application 234. Such context information is processed in the personalization server 106, and patterns in the learned pattern store are updated or added accordingly. Similarly, at time 410, user A 402 and user B 404 are using the endpoint device 108 together, and metrics collected at time 408 are based on the interactions of user A 402 and user B 402 with the content application 234. Such context information is processed in the personalization server 106, and patterns in the learned pattern store are updated or added accordingly. Further, at time 412, user A 402, user B 404 and user C 406 are using the endpoint device 108 together, and metrics collected at time 408 are based on the interactions of user A 402, user B 404 and user C 406 with the content application 234. Such context information is processed in the personalization server 106, and patterns in the learned pattern store are updated or added accordingly. The context information can be used to infer, among other properties, the state of mind, i.e., the mood, of the user(s) of the endpoint device 108.

It is important to note that the content application 234 and the personalization server 106 are unaware of the particular identities of user A 402, user B, 404 and user C 406, or that two or more of the users are interacting together. The context information collected is treated merely as a pattern of interaction.

When the personalization server 106 receives the context information associated with time 414, the set of properties determined based on the context information and other context information related to other endpoint devices 108 are matched against the patterns detected at times 408, 410 and 412. The best-fit pattern is identified, and digital content is recommended based on the best-fit pattern.

Figure 5:
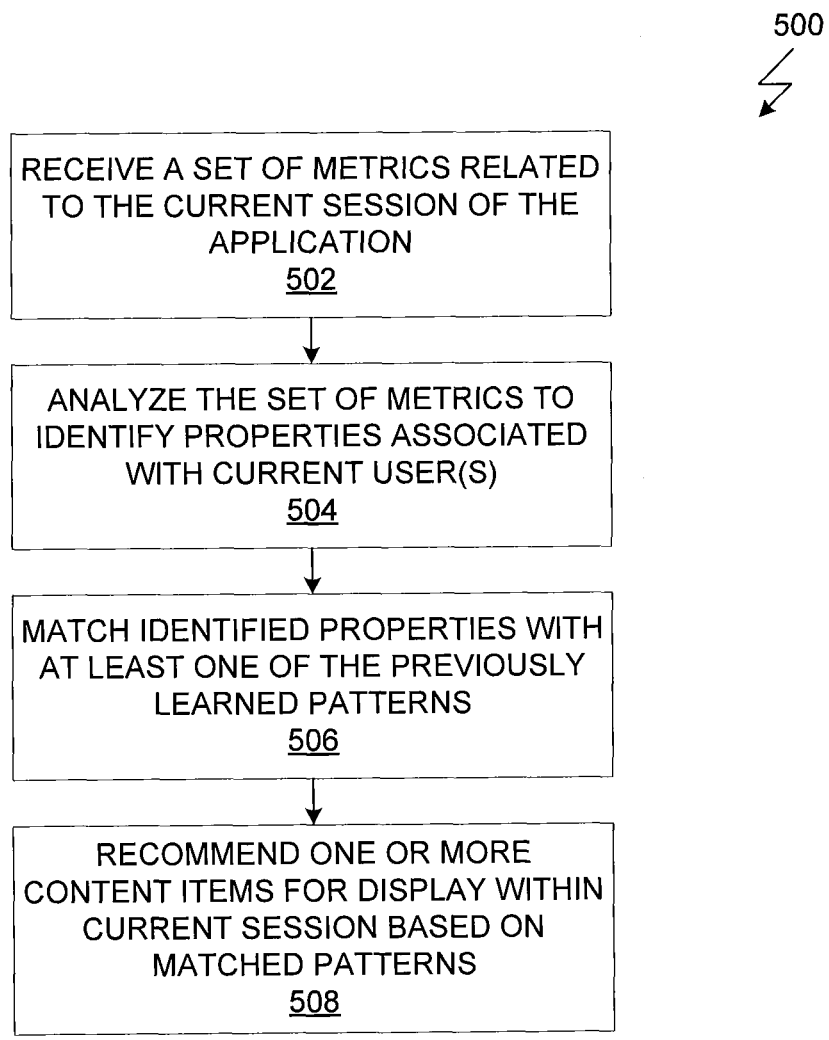
FIG. 5 is a flow diagram of method steps for personalizing recommendations based on the context associated with a current session of the content application, according to one embodiment of the invention.

FIG. 5 is a flow diagram of method steps for personalizing recommendations based on the context associated with a current session of the content application, according to one embodiment of the invention. Although the method steps are described in conjunction with the systems for FIGS. 1-3, persons skilled in the art will understand that any system configured to perform the method steps, in any order, is within the scope of the invention.

The method 500 begins at step 502, where the context processing engine 302 within the personalization server 106 receives context information associated with a current session of the content application 234 from the metrics collection engine 238. At step 504, the context processing engine 302 analyzes the context information to infer a set of properties associated with the user(s) of the endpoint device 108. For example, time of day specified by the context information may indicate that a child is using the endpoint device 108. Another property that can be inferred from the context information is the current state of mind, i.e., the mood, of the user(s) of the endpoint device 108.

At step 506, the context processing engine 302 matches the set of properties against previously-defined patterns of behavior stored in the learned pattern store 304. The pattern of behavior that best-fits the set of properties and, thus, the inferred characteristics of the user(s) of the endpoint device 108, is selected.

At step 508, the recommendation engine 306 within the personalization server 106 analyzes the pattern of behavior selected in step 504 to identify digital content that should be recommended to the user(s) of the endpoint device 108. The recommendation is based on the different actions or digital content type selections that are specified by the selected pattern of behavior. Information regarding the digital content that should be recommended is then transmitted to the content application 236 for display.

One advantage of the disclosed technique is that digital content is recommended to users based on properties related to the identity of the users without having the users explicitly specify their identity.

One embodiment of the invention may be implemented as a program product stored on computer-readable storage media within the endpoint device 108. In this embodiment, the endpoint device 108 comprising an embedded computer platform such as a set top box. An alternative embodiment of the invention may be implemented as a program product that is downloaded to a memory within a computer system, for example as executable instructions embedded within an internet web site. In this embodiment, the endpoint device 108 comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for recommending digital content to at least one user of a client device, the method comprising:
    collecting context information during a current session of a content streaming application, wherein the context information comprises a plurality of metrics describing the current session for streaming content for display on the client device, and wherein the context information is collected at least in part from a second endpoint device that is distinct from the client device;
    analyzing, by operation of one or more computer processors, the context information to determine a set of properties describing the at least one user;
    analyzing a plurality of previously defined patterns of behavior to identify a first pattern of behavior most closely associated with the determined set of properties without considering an identity of the at least one user, wherein each of the plurality of previously defined patterns of behavior describes a pattern of user actions and content selections within a graphical user interface during previous sessions on the client device and by a respective one or more users of the content streaming application; and
    identifying digital content to present to the at least one user within the graphical user interface of the content streaming application for selection, based on the pattern of user actions and content selections described by the identified first pattern of behavior.

2. The method of claim 1, further comprising analyzing context information associated with a previous session of the content application to define the first pattern of behavior.

3. The method of claim 1, further comprising analyzing context information associated with a previous session of a different content application to define the first pattern of behavior.

4. The method of claim 1, wherein the step of analyzing the plurality of previously defined patterns of behavior comprises attaching a weight to each pattern of behavior based on the set of properties, wherein the weight attached to a pattern of behavior indicates a degree of correlation between the at least one user and the pattern of behavior.

5. The method of claim 4, further comprising determining, based on the weight attached to the first pattern of behavior, that the first pattern of behavior has the highest degree of correlation with the at least one user.

6. The method of claim 1, wherein the plurality of metrics includes a last operation performed by the at least one user within the current session.

7. The method of claim 1, wherein the plurality of metrics includes a device on which the content application is executing.

8. The method of claim 1, wherein the plurality of metrics includes the time of day at which the at least one user begins the current session.

9. The method of claim 1, wherein the plurality of metrics includes a geographic location of the at least one user.

10. The method of claim 1, wherein the set of properties further includes at least one property that indicates a range of age for the at least one user.

11. The method of claim 1, wherein the plurality of metrics includes an identity of the at least one user based on data collected from one or more sensors.

12. The method of claim 1, wherein the set of properties further includes at least one property that indicates a number of the at least one user.

13. The method of claim 1, wherein the set of properties further includes at least one property that indicates at least one characteristic of a current state of mind associated with the at least one user.

14. A computer readable medium storing instructions that, when executed by a processor, cause the processor to recommend digital content to at least one user of a client device by performing the steps of:
    collecting context information during a current session of a content streaming application, wherein the context information comprises a plurality of metrics describing the current session for streaming content for display on the client device, and wherein the context information is collected at least in part from a second endpoint device that is distinct from the client device;
    analyzing the context information to determine a set of properties describing the at least one user;
    analyzing a plurality of previously defined patterns of behavior to identify a first pattern of behavior most closely associated with the determined set of properties without considering an identity of the at least one user, wherein each of the plurality of previously defined patterns of behavior describes a pattern of user actions and content selections within a graphical user interface during previous sessions on the client device and by a respective one or more users of the content streaming application; and
    identifying digital content to present to the at least one user within the graphical user interface of the content streaming application for selection, based on the pattern of user actions and content selections described by the identified first pattern of behavior.

15. The computer readable medium of claim 14, further comprising analyzing context information associated with a previous session of the content application to define the first pattern of behavior.

16. The computer readable medium of claim 14, further comprising analyzing context information associated with a previous session of a different content application to define the first pattern of behavior.

17. The computer readable medium of claim 14, wherein the step of analyzing the plurality of previously defined patterns of behavior comprises attaching a weight to each pattern of behavior based on the set of properties, wherein the weight attached to a pattern of behavior indicates a degree of correlation between the at least one user and the pattern of behavior.

18. The computer readable medium of claim 17, further comprising determining, based on the weight attached to the first pattern of behavior, that the first pattern of behavior has the highest degree of correlation with the at least one user.

19. The computer readable medium of claim 14, wherein the plurality of metrics includes a last operation performed by the at least one user within the current session.

20. The computer readable medium of claim 14, wherein the plurality of metrics includes a device on which the content application is executing.

21. The computer readable medium of claim 14, wherein the plurality of metrics includes the time of day at which the at least one user begins the current session.

22. The computer readable medium of claim 14, wherein the set of properties further includes at least one property that indicates a range of age for the at least one user.

23. A computer system, comprising:
    a memory; and
    a processor configured to:
        collect context information during a current session of a content streaming application, wherein the context information comprises a plurality of metrics describing the current session for streaming content for display on the client device, and wherein the context information is collected at least in part from a second endpoint device that is distinct from the client device;
        analyze the context information to determine a set of properties describing the at least one user;
        analyze a plurality of previously defined patterns of behavior to identify a first pattern of behavior most closely associated with the determined set of properties without considering an identity of the at least one user, wherein each of the plurality of previously defined patterns of behavior describes a pattern of user actions and content selections within a graphical user interface during previous sessions on the client device and by a respective one or more users of the content streaming application; and
    identify digital content to present to the at least one user within the graphical user interface of the content streaming application for selection, based on the pattern of user actions and content selections described by the identified first pattern of behavior.

* * * * *